J. E. KRAYER.
TRIMMING AND PRUNING MACHINE.
APPLICATION FILED MAR. 23, 1911.

1,055,476.

Patented Mar. 11, 1913.

2 SHEETS—SHEET 1.

Witnesses

Inventor
J. E. Krayer,
By
Attorney

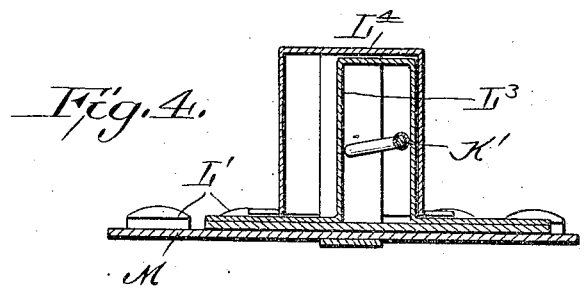
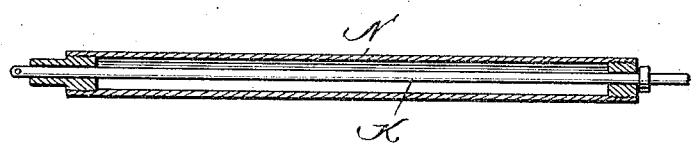
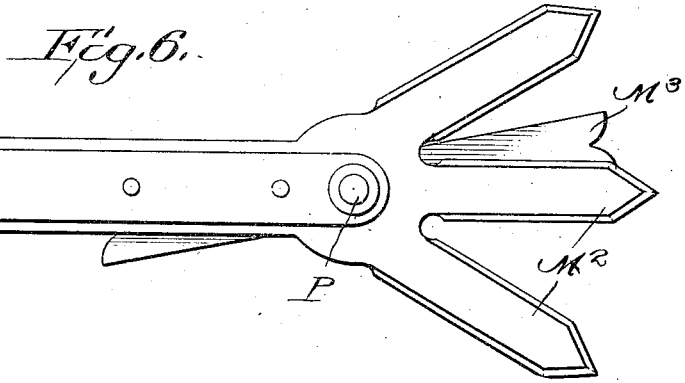
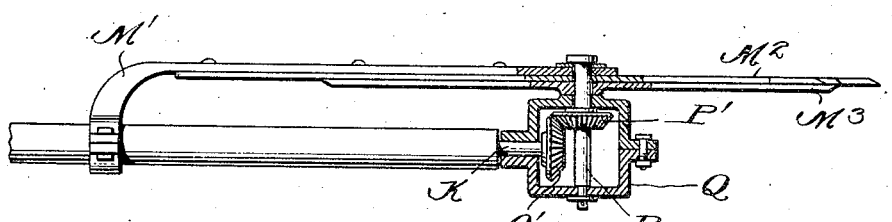

UNITED STATES PATENT OFFICE.

JACQUES EDWARD KRAYER, OF VILLANOVA, PENNSYLVANIA.

TRIMMING AND PRUNING MACHINE.

1,055,476.  Specification of Letters Patent.  Patented Mar. 11, 1913.

Application filed March 23, 1911. Serial No. 616,459.

*To all whom it may concern:*

Be it known that I, JACQUES EDWARD KRAYER, a citizen of the United States, residing at Villanova, in the county of Delaware and State of Pennsylvania, have invented a new and useful Improvement in Trimming and Pruning Machines.

This invention relates to certain new and useful improvements for trimming and pruning hedges and shrubbery, the object being to provide a machine which is exceedingly simple and cheap in construction, and one which can be operated either manually or by motor power.

Another object of my invention is to provide a machine, which can be operated to trim at different heights both sides of a hedge at the same time, the machine to be placed on the most convenient side.

Another object of my invention is to provide a machine which is provided with a pair of tubular inclosed driving shafts to which the flexible shafts for operating the pruning implements are connected, both shafts being driven at the same rate of speed. Also to provide a novel form of pruning implement which is exceedingly simple in construction, and one which is very effective when in use.

With these objects in view, the invention consists in the novel features of construction, combination and arrangements, of parts hereinafter fully described and pointed out in the claim.

Figure 1:
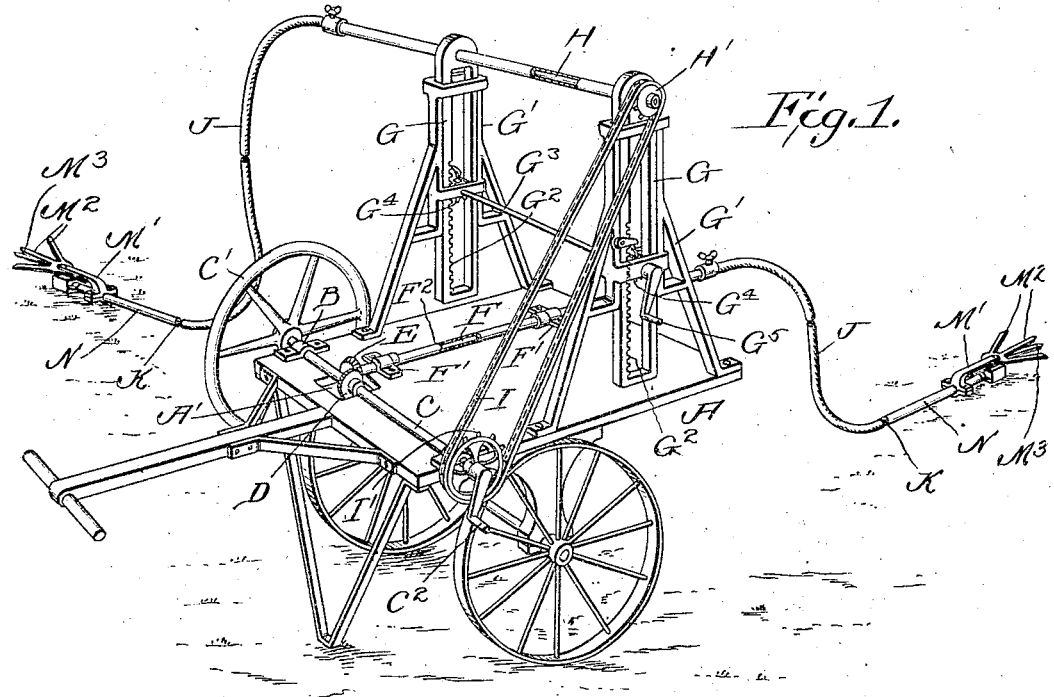
Figure 2:
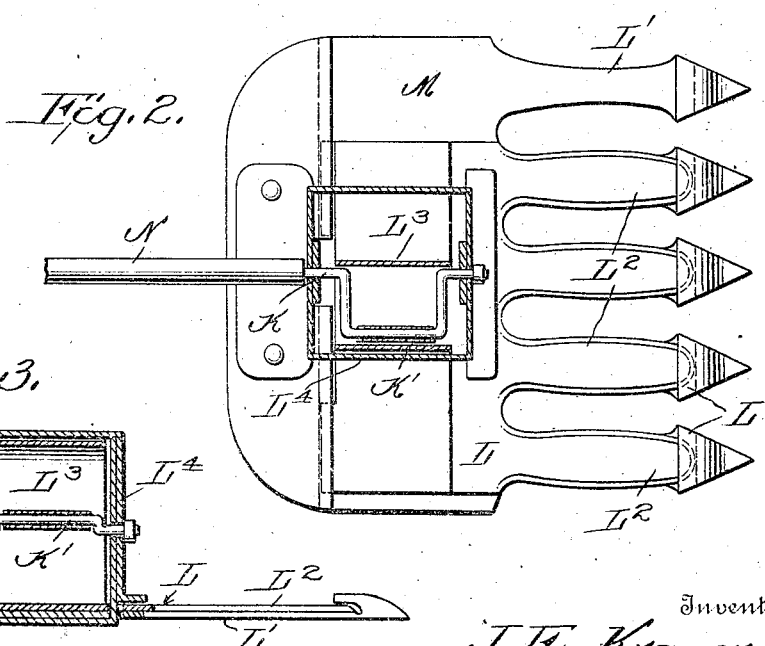
Figure 3:
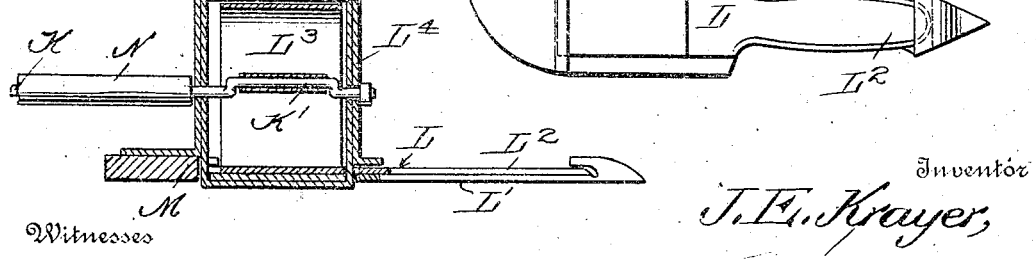

In the drawings forming a part of this specification, Figure 1 is a perspective view of my improved machine. Fig. 2 is a horizontal section through the hedge trimming implement. Fig. 3 is a vertical section through the same. Fig. 4 is a vertical section taken at right angles of that of Fig. 3. Fig. 5 is a horizontal section through the implement handle showing the manner of mounting the shaft. Fig. 6 is a plan view of a modified form of cutting implement which is also adapted to be used for trimming shrubbery and trees of all kind. Fig. 7 is a side elevation of the same partly in section.

In carrying out my improved invention, I employ a wheeled truck A provided with a suitable handle for moving the same, said truck having bearings as at B arranged thereon at one end in which is mounted a shaft C having a fly wheel C' at one end and a crank handle C² at the other end for operating the same. The body of the truck is cut away as shown at A' to receive a beveled gear D, which is fixed on the shaft C which meshes with a beveled gear E carried by a shaft F which is mounted in suitable bearings F' and is inclosed in a tubular sleeve F². It will be seen that when the shaft C is rotated by the crank arm the shaft F will be rotated through the medium of the beveled gears in order to drive a flexible shaft which will be later described.

Arranged on the body of the truck A are extension bearings G which work vertically in brackets G', the bearings G being provided with vertically arranged rack bars G². A transverse shaft G³ is provided with suitable gears G⁴ which mesh with the teeth of the rack bars G², and the shaft G³ is provided with a suitable operating handle G⁵. By rotating said shaft the bearings G will be raised or lowered to suit the height of the hedge to be trimmed. In these bearings is mounted a shaft H suitably inclosed and which carries a sprocket H' at one end, over which passes a sprocket chain I carried by a sprocket wheel I' fixed on the shaft C adjacent to the crank C² whereby the shaft H will be rotated at the same time the shaft C is rotated and at a higher rate of speed for the purpose later described.

Connected to the ends of shafts F and H are flexible shafts J to which are adapted to be connected the driving shafts K of a cutting implement comprising a stationary portion M and a movable portion L, said shafts being mounted in suitable bearings of tubular handles N used for supporting and handling the cutting implements as will be later described.

In Figs. 2, 3 and 4, I show a cutting implement especially adapted to be used for trimming hedges, which comprises a plate having guard fingers L' extending therefrom, over which work cutting blades L² said blades being carried by a boxing L³ mounted in a suitable housing L⁴ in which is mounted the end of the shaft K which in this form is provided with a crank portion K' carrying a rotatable sleeve or roller K² adapted to reciprocate the cutting blades when the shaft is rotated. By employing a machine provided with two flexible shafts, and providing a cutting implement for each shaft two men can engage at the same time in trimming the hedge, one upon one side and one upon the other, the device being moved along the hedge by a third man, who can also operate the implement driving mechanism when the same is driven by hand power.

In Figs. 6 and 7 I show the cutting implements especially adapted to be used for cutting shrubbery and trees, and comprising a supporting arm M' mounted on the sleeve of one of the shafts K and carrying guard fingers M² which co-act with a rotatable knife M³ carried by a vertical shaft P the upper end of which is mounted in the arm M' and the lower end is mounted in a suitable frame Q arranged on the end of the shaft K. Said shaft P carries a beveled gear P' which meshes with a beveled gear Q' carried by the shaft K in such a manner that the knife will be rotated when the shaft K is rotated. The fingers M² correspond to the guards L' and when said fingers are inserted among the small branches of a bush or tree the branches caught between the fingers M² will be sheared off by the rotatable blade M³.

What I claim is:—

In a hedge trimming machine, a plate having guard fingers extending therefrom, a housing carried by said plate, a rotatable shaft, the shaft having a crank portion and being journaled in said housing on opposite sides of said crank portion, a boxing arranged within said housing and adapted to move back and forth therein, the crank portion of the shaft working in said boxing, a sleeve loosely mounted upon said crank portion, and cutting blades carried by said boxing and adapted to work over said guards.

JACQUES EDWARD KRAYER.

Witnesses:
 LAURENCE RAMEY,
 SAMUEL J. MCLAUGHLIN.